(12) United States Patent
Wu et al.

(10) Patent No.: US 11,860,030 B2
(45) Date of Patent: Jan. 2, 2024

(54) METHODS AND APPARATUSES FOR DETECTING AMBIENT LIGHT ILLUMINANCE AND FOR COMPUTING CORRECTION COEFFICIENT AND ELECTRONIC DEVICE

(71) Applicant: SHENZHEN GOODIX TECHNOLOGY CO., LTD., Shenzhen (CN)

(72) Inventors: Zhiying Wu, Shenzhen (CN); Songjin Zhong, Shenzhen (CN); Canhong Du, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/587,240

(22) Filed: Jan. 28, 2022

(65) Prior Publication Data
US 2022/0260414 A1 Aug. 18, 2022

(30) Foreign Application Priority Data
Feb. 5, 2021 (CN) .......................... 202110163944.0

(51) Int. Cl.
*G01J 1/42* (2006.01)
*G01J 1/04* (2006.01)
*G01J 1/02* (2006.01)

(52) U.S. Cl.
CPC ........... *G01J 1/4204* (2013.01); *G01J 1/0295* (2013.01); *G01J 1/0488* (2013.01)

(58) Field of Classification Search
CPC .......... G01J 1/4202; G01J 1/42; G01J 1/0492; G01J 1/0488; G01J 1/0433; G01J 1/0407;
(Continued)

(56) References Cited

U.S. PATENT DOCUMENTS

2002/0043613 A1  4/2002  Suzuki et al.
2010/0225628 A1  9/2010  Souchkov et al.
(Continued)

FOREIGN PATENT DOCUMENTS

CN   102538955 A   7/2012
CN   108172175 A   6/2018
(Continued)

OTHER PUBLICATIONS

Quantum efficiency, https://en.wikipedia.org/w/index.php?title=Quantum_efficiency&oldid=664542613, May 29, 2015.
(Continued)

*Primary Examiner* — John R Lee
(74) *Attorney, Agent, or Firm* — Emerson, Thomson & Bennett, LLC; Roger D. Emerson; Matt J. Wilson (57) ABSTRACT

Embodiments of the present disclosure provide methods and apparatuses for detecting an ambient light illuminance and for computing a correction coefficient, and an electronic device. The method for detecting an ambient light illuminance includes: filtering ambient light based on a monochromatic channel, such that a quantum efficiency curve of the filtered light matches a spectral luminous efficiency curve; and performing photoelectric detection on the filtered light to obtain an illuminance level of the ambient light. In solutions of the embodiments of the present disclosure, the photoelectric detection may be equivalent to obtaining an illuminance level of light by convolutional computation based on a spectral luminous efficiency curve, and therefore, when the quantum efficiency curve for a monochromatic waveband obtained by filtering ambient light based on a monochromatic channel matches the spectral luminous efficiency curve, a reliable spectral luminous efficiency curve can be obtained with a small computing workload.

17 Claims, 6 Drawing Sheets

Filtering ambient light based on a monochromatic channel, such that a quantum effect curve of the filtered light matches a spectral luminous efficiency curve — 210

Performing photoelectric detection on the filtered light to obtain an illuminance level of the ambient light — 220

(58) Field of Classification Search
CPC .......... G01J 1/04; G01J 1/0295; G01J 1/0214; G01J 1/02
See application file for complete search history.

(56) References Cited

U.S. PATENT DOCUMENTS

| | | | |
|---|---|---|---|
| 2011/0043503 A1 | 2/2011 | Hadwen | |
| 2012/0313908 A1* | 12/2012 | Broga | G06F 1/1684 |
| | | | 345/207 |
| 2017/0084250 A1* | 3/2017 | Jia | G01J 3/10 |
| 2021/0082094 A1* | 3/2021 | McCall | G06T 7/62 |
| 2022/0260414 A1* | 8/2022 | Wu | H05B 47/11 |

FOREIGN PATENT DOCUMENTS

| | | |
|---|---|---|
| CN | 111968607 A | 11/2020 |
| CN | 112161703 A | 1/2021 |
| JP | H0450623 A | 2/1992 |

OTHER PUBLICATIONS

Photosensor tutorial, https://www.lrc.rpi.edu/programs/nlpip/tutorials/photosensors/spectral.asp, Oct. 23, 2021.

\* cited by examiner

| W | B | W | G | R | W |
|---|---|---|---|---|---|
| G | W | R | B | G | W |
| R | B | G | W | R | B |
| W | B | G | R | W | G |
| B | R | W | G | B | W |
| W | G | R | B | W | W |

# METHODS AND APPARATUSES FOR DETECTING AMBIENT LIGHT ILLUMINANCE AND FOR COMPUTING CORRECTION COEFFICIENT AND ELECTRONIC DEVICE

CROSS-REFERENCE TO RELATED APPLICATIONS

The present disclosure claims priority to Chinese Patent Application No. 202110163944.0, filed with the Chinese patent Office on Feb. 5, 2021 and entitled "METHODS AND APPARATUSES FOR DETECTING AMBIENT LIGHT ILLUMINANCE AND FOR COMPUTING CORRECTION COEFFICIENT AND ELECTRONIC DEVICE", the entire contents of which are incorporated herein by reference.

TECHNICAL FIELD

Embodiments of the present disclosure relate to the field of optics, and in particular to a method for detecting an ambient light illuminance, an apparatus for detecting an ambient light illuminance, a method for computing a correction coefficient, an apparatus for computing a correction coefficient, and an electronic device.

BACKGROUND

With the development and popularization of smart electronic devices, users have increasingly higher requirements for their own visual experience, and power saving and cruising power of their devices. A highly integrated and high-precision ambient light sensor enables a system to adjust screen brightness based on ambient light changes, thereby improving the users' visual experience and saving the power consumption of the system.

Usually, the ambient light sensor is as sensible to a visible light waveband as human eyes, and is as sensitive to light in different wavebands as human eyes, so as to simulate human eyes in acquiring the intensity of the surrounding ambient light.

In the related art, an under-screen ambient light sensor chip provided with various filtering channels is used to compute an illuminance level of the ambient light, but such an under-screen ambient light sensor chip requires a large computing workload.

SUMMARY

In view of this, one of the technical problems to be solved in embodiments of the present disclosure is to provide a method for detecting an ambient light illuminance, an apparatus for detecting an ambient light illuminance, a method for computing a correction coefficient, an apparatus for computing a correction coefficient, and an electronic device.

According to a first aspect of the embodiments of the present disclosure, a method for detecting an ambient light illuminance is provided, including: filtering ambient light based on a monochromatic channel, such that a quantum efficiency curve of the filtered light matches a spectral luminous efficiency curve; and performing photoelectric detection on the filtered light to obtain an illuminance level of the ambient light.

According to a second aspect of the embodiments of the present disclosure, a method for computing a correction coefficient is provided, including: filtering light of a to-be-tested light source based on a monochromatic channel, such that a quantum efficiency curve of the filtered light matches a spectral luminous efficiency curve; detecting a sensor sampling value of the filtered light using a light sensor; and computing a proportional relationship between the sensor sampling value and a measured illuminance level of the filtered light, to obtain a sensor correction coefficient of the light sensor.

According to a third aspect of the embodiments of the present disclosure, an apparatus for detecting an ambient light illuminance is provided, including: a filtering module configured to filter ambient light based on a monochromatic channel, such that a quantum efficiency curve of the filtered light matches a spectral luminous efficiency curve; and a detecting module configured to perform photoelectric detection on the filtered light to obtain an illuminance level of the ambient light.

According to a fourth aspect of the embodiments of the present disclosure, an apparatus for computing a correction coefficient is provided, including: a filtering module configured to filter light of a to-be-tested light source based on a monochromatic channel, such that a quantum efficiency curve of the filtered light matches a spectral luminous efficiency curve; a detecting module configured to detect a sensor sampling value of the filtered light using a light sensor; and a computing module configured to compute a proportional relationship between the sensor sampling value and a measured illuminance level of the filtered light, to obtain a sensor correction coefficient of the light sensor.

According to a fifth aspect of the embodiment of the present disclosure, an electronic device is provided, including: the apparatus for detecting an ambient light illuminance according to the first aspect, and a display screen, where the apparatus for detecting an ambient light illuminance is arranged below the display screen; or the apparatus for computing a correction coefficient according to the second aspect and a display screen, where the apparatus for detecting an ambient light illuminance is arranged below the display screen.

In solutions of embodiments of the present disclosure, the photoelectric detection may be equivalent to obtaining an illuminance level by convolutional computation based on a spectral luminous efficiency curve, and therefore, when a quantum efficiency curve for a monochromatic waveband obtained by filtering ambient light based on a monochromatic channel matches the spectral luminous efficiency curve, a reliable spectral luminous efficiency curve can be obtained with a small computing workload, thereby avoiding a large computing workload caused when collecting light in a plurality of wavebands whist guaranteeing a reliable illuminance level of the ambient light during photoelectric detection of the filtered light.

BRIEF DESCRIPTION OF THE DRAWINGS

Some specific embodiments of embodiments of the present disclosure will be described in detail below with reference to the accompanying drawings in an exemplary manner, instead of in a limiting manner Identical reference numerals in the accompanying drawings represent identical or similar components or parts. Those skilled in the art should understand that these figures may not be drawn to scale. In the figures.

DETAILED DESCRIPTION OF EMBODIMENTS

Specific implementations of embodiments of the present disclosure will be further described below with reference to the accompanying drawings of the embodiments of the present disclosure.

Figure 1:
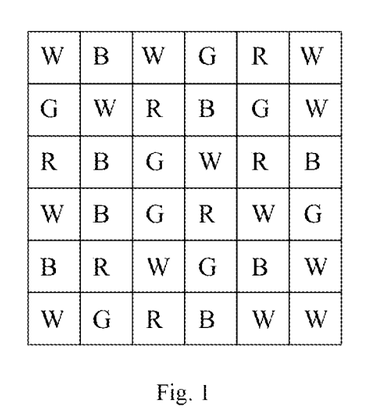
FIG. 1 is a schematic diagram of a color channel configuration of a typical example ambient light sensor.

FIG. 1 is a schematic diagram of a color channel configuration of a typical example ambient light sensor. As shown in FIG. 1, an under-screen ambient light sensor with a plurality of filtering channels is required to have a plurality of color filtering (CF) channels, including red (R), green (G), blue (B), and white (W), and is required to compute a corresponding DN (digital number) value (an example of a sensor sampling value) of each channel, thereby putting forward high requirements on the computing power of its chip, i.e., the chip has a large computing workload.

In addition, the plurality of filtering channels is arranged on the chip, and a luminous flux of each filtering channel needs to meet the requirements, thereby greatly increasing the chip area, and further increasing the production cost of the chip.

In addition, in the case of a certain chip area, in order to improve the collection efficiency of ambient light, it is necessary to densely arrange a plurality of filtering channels, thereby resulting in great interference between adjacent filtering channels corresponding to different wavebands. Therefore, decoupling (for example, RGB decoupling) is required within the chip based on different channels, in order to eliminate this interference, but the decoupling operation itself has an unnegligible decoupling error.

Figure 2A:
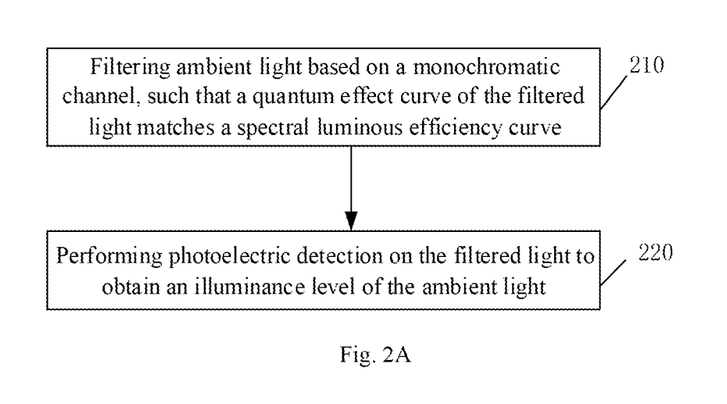
FIG. 2A is a schematic flowchart of a method for detecting an ambient light illuminance according to another embodiment of the present disclosure.

FIG. 2A is a schematic flowchart of a method for detecting an ambient light illuminance according to another embodiment of the present disclosure. The method for detecting an ambient light illuminance may be executed by an apparatus for detecting an ambient light illuminance. The apparatus for detecting an ambient light illuminance may be arranged in an electronic device. The apparatus for detecting an ambient light illuminance may be configured using any hardware or software. For example, the apparatus for detecting an ambient light illuminance may be configured as a light sensor, such as an ambient light sensor. The ambient light sensor may be provided with one or more monochromatic filtering channels. The ambient light sensor may be arranged below a display screen of the electronic device as an under-screen ambient light sensor, or may be arranged at other positions of the electronic device.

The method for detecting an ambient light illuminance in FIG. 2A includes:

210: filtering ambient light based on a monochromatic channel, such that a quantum efficiency curve of the filtered light matches a spectral luminous efficiency curve.

It should be understood that a monochromatic waveband may be a waveband in which a quantum efficiency curve for the monochromatic waveband matches the spectral luminous efficiency curve. For example, a filtering waveband of the monochromatic channel ranges from 500 nm to 560 nm. A RGB color mode may be used, or other color modes may be used. In the RGB color mode, various colors are obtained by changing red (R), green (G), and blue (B) channels and superimposing them on each other. RGB represents colors of the red, green, and blue channels. Other numbers of channels may also be used. Preferably, the monochromatic channel in the embodiment of the present disclosure is one channel among a plurality of channels, and contributes to realize the compatibility with an existing light sensor.

It should be further understood that the matching of the quantum efficiency curve of the filtered light with the spectral luminous efficiency curve may be determined by a filtering range of the monochromatic channel, i.e., when filtering parameters of such a monochromatic channel are determined, the quantum efficiency curve of the filtered light matches the spectral luminous efficiency curve. The so-called matching herein may mean that a difference between an ordinate value of a quantum efficiency curve of the monochromatic channel within the filtering range and an ordinate value (luminous efficiency value) of the spectral luminous efficiency curve is within a preset range, for example, 10%. The quantum efficiency curve of the filtered light may only have the filtering waveband of the monochromatic channel, or may have other filtering wavebands.

It should be further understood that a filter element having the monochromatic channel may be used to filter the ambient light, and the filter element may be an ideal filter element, i.e., light passing through the filter element only has the filtering range of the monochromatic channel; or the filter element may be a non-ideal filter element, i.e., light passing through the filter element may have a filtering range outside the filtering range of the monochromatic channel, for example, the monochromatic channel may be a green monochromatic channel, and the light passing through the filter element may also include a component of red light or blue light.

220: performing photoelectric detection on the filtered light to obtain an illuminance level of the ambient light.

It should be understood that photoelectric detection may be performed on the filtered light using a light sensor to obtain a sensor sampling value of the light; and the sensor sampling value of the light may be corrected based on a preset sensor correction coefficient to obtain the illuminance level of the ambient light.

It should be further understood that the preset correction coefficient may be determined by the apparatus for detecting an ambient light illuminance. For example, the sensor correction coefficient may be determined by providing a to-be-tested light source and an illuminance measuring apparatus such as an illuminometer. Light emitted from the to-be-tested light source is irradiated on the filter element, and the illuminance measuring apparatus may measure an illuminance level at a position on the light sensor where light passing through the filter element is received. For example, each electronic device may be corrected based on the apparatus for detecting an ambient light illuminance, thereby avoiding the influence of differences in hardware configurations or software configurations of different electronic devices on the ambient light detection.

It should be further understood that a sensor correction coefficient that is measured by other approaches or is preset may also be stored in the light sensor or in a storage space of the electronic device, thereby realizing the quick configuration of the apparatus for detecting an ambient light illuminance in different electronic devices.

In solutions of the embodiments of the present disclosure, the photoelectric detection may be equivalent to obtaining an illuminance level of light by convolutional computation based on a spectral luminous efficiency curve, and therefore, when a quantum efficiency curve for a monochromatic waveband obtained by filtering ambient light based on a monochromatic channel matches the spectral luminous efficiency curve, a reliable spectral luminous efficiency curve can be obtained with a small computing workload, thereby avoiding a large computing workload caused when collecting light in a plurality of wavebands whist guaranteeing that a reliable illuminance level of the ambient light can be obtained during photoelectric detection of the filtered light.

The principle of spectral illuminous efficiency on which the photoelectric detection is based is first described below. Generally, due to differences in cells such as cone cells and rod cells, different people have different sensibility to light in the same waveband. A response of a human eye to light indicates how the human eye perceives the brightness of light in different wavebands under the same luminous power, and is usually determined as an experimentally obtained average value.

In addition, a spectral response of the human eye to light in environments of different brightness will also change. For example, in the case of high brightness (for example, when the light brightness is greater than 3 cd/m$^2$), the cone cells are active, and the human eye can distinguish details and colors of an object. In this case, the human eye has a strongest spectral response to light in a waveband of approximately 550 nm, and vision of the human eye is referred to as photopic vision. For example, in an extremely dark environment (for example, when the light brightness is less than 0.0005 cd/m$^2$), the cone cells are inactivated, and a photosensitive function of the rod cells of the human eye can only be used to distinguish light and dark without color sensation. Further, the ability of the human eye to distinguish details of an object is also greatly reduced. In this case, the human eye has a strongest response to light in a waveband of approximately 507 nm, and vision of the human eye is referred to as scotopic vision. Vision of the human eye between the above two situations, i.e., in a dark environment between extreme darkness and high brightness, is referred to as intermediate vision. At present, components, such as a screen and a camera, are all adapted to color, and a current under-screen ambient light sensor mainly supports photopic response.

The International Commission on Illumination has found through researches that, as shown in Table 1, in the case of high brightness, the human eye is most sensitive to light at a wavelength of approximately 555 nm (green light in a visible light waveband), where the spectral luminous efficiency V$\lambda$ is 1; and a waveband with spectral luminous efficiency V2=0 is a non-visible light waveband. Specifically, a spectral visual efficiency at each wavelength is shown in Table 1. As shown in Table 1, a luminous efficiency of red light at a wavelength of 740 nm is 0.025%, and a luminous efficiency of blue light at a wavelength of 440 nm is 2.3%.

TABLE 1

Spectral luminous efficiency at each wavelength

| Wavelength (mm) | Corresponding light color | Luminous efficiency | Wavelength (mm) | Corresponding light color | Luminous efficiency | Wavelength (mm) | Corresponding light color | Luminous efficiency |
|---|---|---|---|---|---|---|---|---|
| 380 | Purple light | 0.004% | 400 | Purple light | 0.04% | 420 | Purple light | 0.4% |
| 440 | Blue light | 2.3% | 460 | Cyan light | 6% | 480 | Cyan light | 13.9% |
| 500 | Green light | 32.3% | 520 | Green light | 71.0% | 540 | Green light | 95.4% |
| 560 | Green light | 99.5% | 580 | Yellow light | 87% | 600 | Orange light | 63.1% |
| 620 | Orange light | 38.1% | 640 | Red light | 17.5% | 660 | Red light | 6.1% |
| 680 | Red light | 0.17% | 700 | Red light | 0.4% | 720 | Red light | 0.1% |
| 740 | Red light | 0.025% | 760 | Red light | 0.006% | 780 | Red light | 0.0015% |

As can be seen from comparison, the spectral luminous efficiency curve based on photopic vision of the human eye matches a quantum efficiency curve corresponding to a specific green filtering channel.

Illuminance level computation may be considered as a result of convolution operation between a spectral distribution curve and a photopic response curve of the human eye. For example, a spectral distribution curve of a target object may be a spectrum of light reflected from the target object, and a practical illuminance level of the target object is a result of convolution operation between the spectrum of the reflected light and a photopic curve of the human eye.

Similarly, in the case where the photopic response curve of the human eye matches a quantum efficiency curve of light in the monochromatic waveband, the photopic response curve y($\lambda$) of the human eye is replaced with the quantum efficiency curve of light in the monochromatic waveband in spectral distribution convolution, and an accurate illuminance level of the target object is measured accordingly.

In an example, accurate ambient light measurement may be accomplished with an ambient light sensor provided with a G (green) monochromatic filtering channel, thereby achieving excellent backward compatibility with a wise configuration. It should be understood that the green monochromatic channel herein means that the filtering waveband corresponding to the monochromatic channel is tested to be close to green, but does not mean that any channel for a green waveband is consistent with the so-called monochromatic channel in the embodiments of the present disclosure. In addition, the monochromatic channel in the embodiments of the present disclosure may also have a non-green portion.

In an example, in an electronic device, the apparatus for detecting an ambient light illuminance may be arranged below a screen or at other positions of the electronic device, and the detected ambient light illuminance is used to adjust screen brightness of the electronic device. The apparatus for detecting an ambient light illuminance may also serve as a universal apparatus for detecting an ambient light illuminance. When the apparatus for detecting an ambient light illuminance is arranged below the screen of the electronic device, the ambient light sensor may receive ambient light passing through the screen; and the ambient light enters the ambient light sensor, and then passes through the G (green) filtering channel, i.e., ambient light in a waveband (monochromatic waveband) to which the human eye is sensitive is obtained.

Figure 2B:
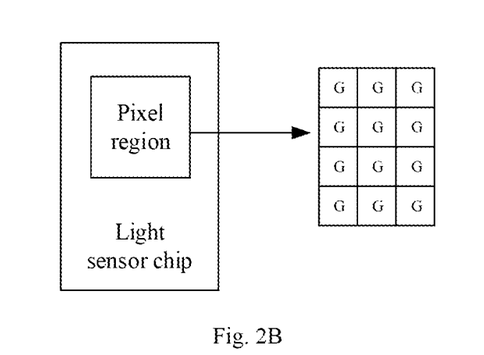
FIG. 2B is a schematic diagram of a color channel configuration of an ambient light sensor according to another embodiment of the present disclosure.

FIG. 2B is a schematic diagram of a color channel configuration of an ambient light sensor according to another embodiment of the present disclosure. As shown in the figure, each pixel region of the light sensor corresponds to each monochromatic filtering channel respectively, thereby achieving excellent backward compatibility. Each monochromatic filtering channel may have uniform and consistent channel configuration parameters. In this example, adjacent monochromatic filtering channels have the same channel configuration parameters, thereby avoiding interference caused by adjacent filtering channels having different channel configuration parameters. In addition, since the adjacent monochromatic filtering channels have the same channel configuration parameters, there is not a close relationship between the filtering effect and the chip size (i.e., the number of monochromatic channels), i.e., a small number of monochromatic channels can also achieve a relatively ideal filtering effect. Therefore, the filtering effect can be achieved using a small surface of the light sensor chip, and accordingly, the manufacturing cost of the light sensor is also reduced.

Before detecting illumination levels of a plurality of kinds of ambient light, a light source (to-be-corrected light source or to-be-tested light source) may be used for correction as required, to obtain a correction coefficient K. For example, a light source for correction may be D50, and the to-be-corrected light source may be installed in an electronic device, such as a mobile phone. The basic process of correction may be performed by controlling the electronic device (for example, entering a specific application program of the electronic device) to turn on or adjust an illuminance level of the to-be-corrected light source. An illuminance measuring apparatus provided with, e.g., an illuminometer, may also be installed in the electronic device, and may also be controlled by a specific application program (e.g., an ambient light illuminance measuring and correcting application), in order to determine a sensor correction coefficient.

In a specific implementation, a sampling value DN is read through a data transmission bus of a chip. In this case, the sampling value includes not only the ambient light, but also screen light leakage. The light leakage portion is subtracted from the sampling value DN, and then the difference is multiplied by the correction coefficient K, or the sampling value DN is first multiplied by the correction coefficient K, and then the screen light leakage is subtracted from the product, such that an ambient light illuminance Y can be obtained.

The present disclosure is adapted to different light sources with various spectral distributions, without RGB decoupling, and after screen light leakage is removed, accurate ambient light illuminance can be obtained.

In another implementation of the present disclosure, the filtering the ambient light based on the monochromatic channel includes: filtering the ambient light using a filter element having the monochromatic channel.

The ambient light is filtered using a filter element for filtering light in a monochromatic waveband, thereby achieving efficient filtering using a simple component.

In another implementation of the present disclosure, the performing photoelectric detection on the filtered light includes: performing photoelectric detection on the filtered light using the light sensor, where the filter element is arranged on a photosensitive surface of the light sensor.

The filter element is arranged on the photosensitive surface of the light sensor, thereby achieving efficient photoelectric detection using a simple component, and then achieving efficient ambient light illuminance detection.

In another implementation of the present disclosure, the filter element includes a plurality of adjacent filtering channels, where the plurality of adjacent filtering channels corresponds to a plurality of adjacent regions on the photosensitive surface respectively.

The filter element includes the plurality of adjacent filtering channels, where the plurality of adjacent filtering channels corresponds to the plurality of adjacent regions on the photosensitive surface respectively, thereby achieving backward compatibility of components. In other words, it is only necessary to adjust a filtering range of each filtering channel to a monochromatic filtering range without excessively changing a hardware structure of a component, and then the filtering of light in the monochromatic waveband is realized.

In addition, based on this configuration, it is not necessary to densely arrange a plurality of filtering channels, so that there is no interference between adjacent filtering channels corresponding to different wavebands, thereby avoiding complex decoupling operations within the chip.

In addition, based on this configuration, the chip area is reduced, thereby reducing the production cost of the chip.

In another implementation of the present disclosure, the performing photoelectric detection on the filtered light to obtain the illuminance level of the ambient light includes: performing photoelectric detection on the filtered light using the light sensor, to obtain a sensor sampling value of the light; and correcting the sensor sampling value of the light based on a preset sensor correction coefficient to obtain the illuminance level of the ambient light.

The sensor sampling value of the light contributes to improving digital processing of sample data, thereby improving the data processing efficiency.

In another implementation of the present disclosure, the ambient light is under-screen ambient light, where the correcting the sensor sampling value of the light based on the preset sensor correction coefficient to obtain the illuminance level of the ambient light includes: removing screen light leakage in the light to obtain a correction value of the sensor sampling value; and determining an illuminance level of the under-screen ambient light based on a proportional relationship between the correction value and the sensor correction coefficient.

The influence of screen light leakage in the light is removed, thereby improving the accuracy of the illuminance level of the under-screen ambient light.

In another implementation of the present disclosure, the ambient light is under-screen ambient light, where the correcting the sensor sampling value of the light based on the preset sensor correction coefficient to obtain the illuminance level of the ambient light includes: determining an initial illuminance level of the ambient light based on a proportional relationship between the sensor sampling value of the light and the sensor correction coefficient; and correcting the initial illuminance level of the ambient light by removing screen light leakage in the light, to obtain an illuminance level of the under-screen ambient light.

The influence of screen light leakage in the light is removed, thereby improving the accuracy of the illuminance level of the under-screen ambient light.

Figure 3A:
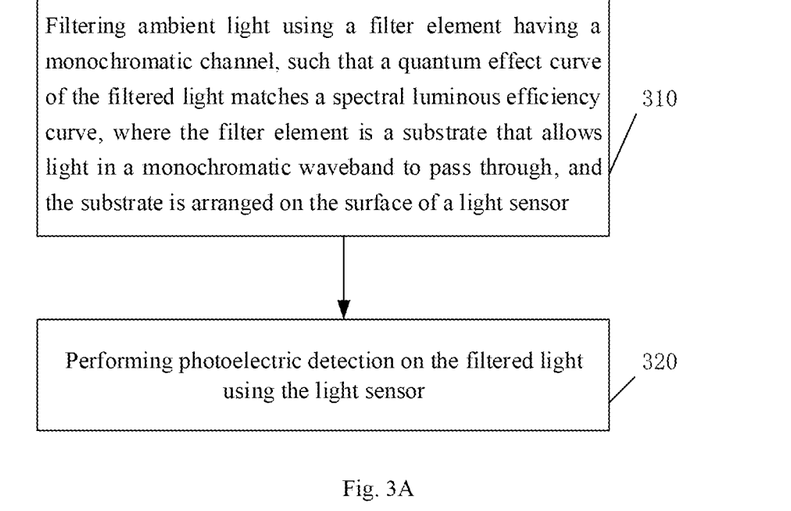
FIG. 3A is a schematic flowchart of a method for detecting an ambient light illuminance according to another embodiment of the present disclosure.

FIG. 3A is a schematic flowchart of a method for detecting an ambient light illuminance according to another embodiment of the present disclosure. The method for detecting an ambient light illuminance in FIG. 3A includes:

310: filtering ambient light using a filter element having a monochromatic channel, such that a quantum efficiency curve of the filtered light matches a spectral luminous efficiency curve, where the filter element is a substrate that allows light in a monochromatic waveband to pass through, and the substrate is arranged on the surface of a light sensor.

320: performing photoelectric detection on the filtered light using the light sensor.

Figure 3B:
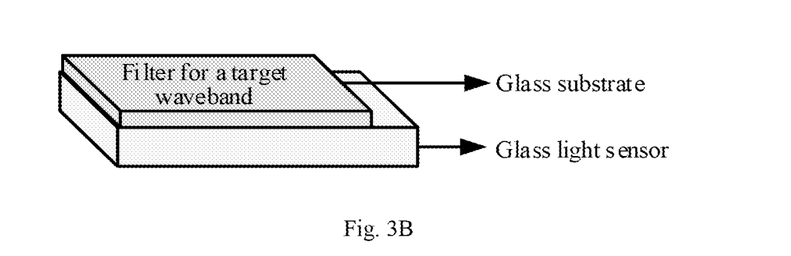
FIG. 3B is a schematic diagram of a method for detecting an ambient light illuminance according to another embodiment of the present disclosure.

FIG. 3B is a schematic diagram of a method for detecting an ambient light illuminance according to another embodiment of the present disclosure. As shown in the figure, the filter element having the monochromatic channel may be configured as a substrate, such as a glass substrate, and may be arranged above an ambient light sensor. The monochromatic channel may be a filtering channel, such as a green filtering channel.

Figure 4A:
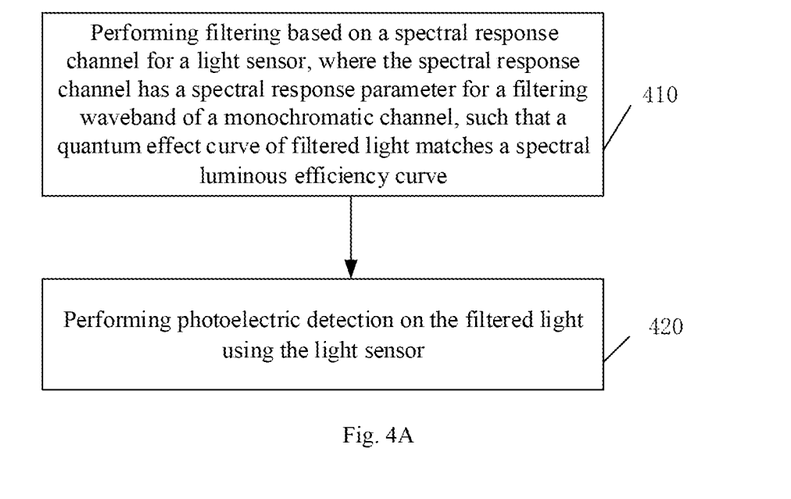
FIG. 4A is a schematic flowchart of a method for detecting an ambient light illuminance according to another embodiment of the present disclosure.

FIG. 4A is a schematic flowchart of a method for detecting an ambient light illuminance according to another embodiment of the present disclosure. The method for detecting an ambient light illuminance in FIG. 4A includes:

410: performing filtering based on a spectral response channel for a light sensor, where the spectral response channel has a spectral response parameter for a filtering waveband of a monochromatic channel, such that a quantum efficiency curve of filtered light matches a spectral luminous efficiency curve.

420: performing photoelectric detection on the filtered light using the light sensor.

Figure 4B:
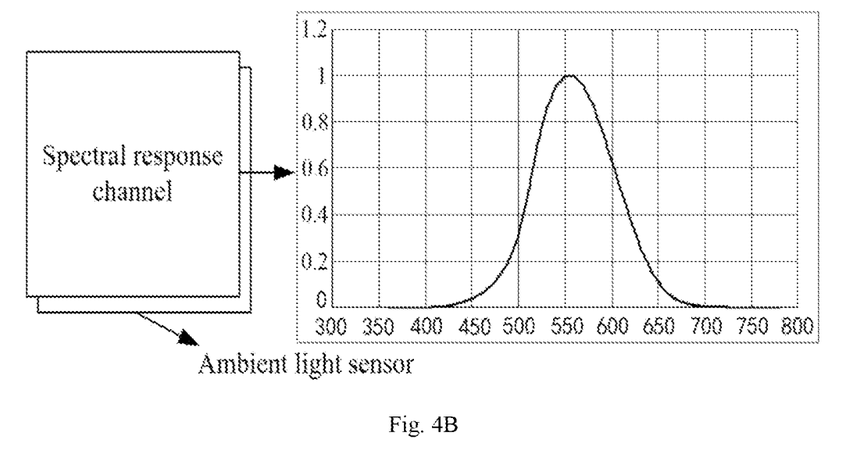
FIG. 4B is a schematic diagram of a method for detecting an ambient light illuminance according to another embodiment of the present disclosure.

FIG. 4B is a schematic diagram of a method for detecting an ambient light illuminance according to another embodiment of the present disclosure. As shown in the figure, a filter element is configured as a spectral response channel of an ambient light sensor, each spectral response channel corresponds to a photosensitive pixel of each light sensor, and the spectral response channel has a spectral response parameter for a monochromatic waveband, thus filtering light in the monochromatic waveband. It should be understood that each spectral response channel may be adjusted, such that a quantum efficiency curve of filtered light matches a spectral luminous efficiency curve. In an example, the spectral response channel may be realized by generating an epitaxial chip on a light sensor chip, thereby improving an integration level of the chip, and guaranteeing small space occupancy of the chip.

Figure 5A:
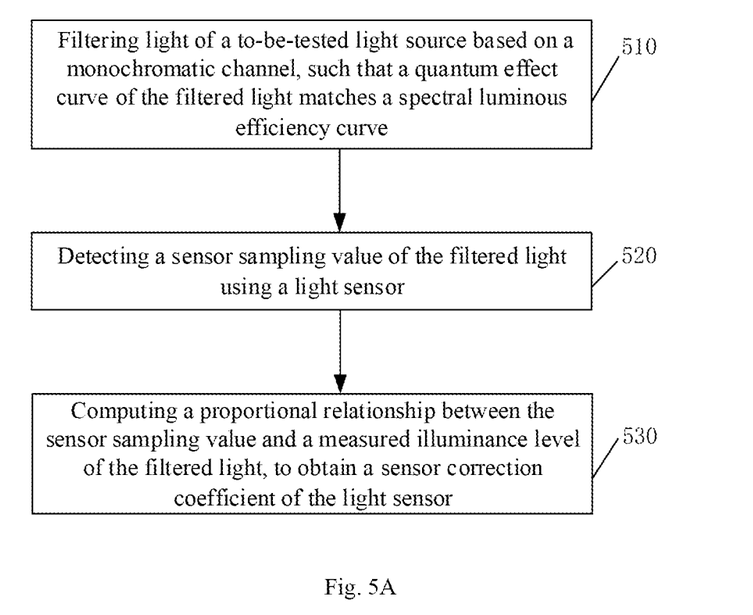
FIG. 5A is a schematic flowchart of a method for computing a correction coefficient according to another embodiment of the present disclosure.

FIG. 5A is a schematic flowchart of a method for computing a correction coefficient according to another embodiment of the present disclosure. The method for computing a correction coefficient in FIG. 5A includes:

510: filtering light of a to-be-tested light source based on a monochromatic channel, such that a quantum efficiency curve of the filtered light matches a spectral luminous efficiency curve.

520: detecting a sensor sampling value of the filtered light using a light sensor.

530: computing a proportional relationship between the sensor sampling value and a measured illuminance level of the filtered light, to obtain a sensor correction coefficient of the light sensor.

In solutions of the embodiments of the present disclosure, the photoelectric detection may be equivalent to obtaining an illuminance level of light by convolutional computation based on a spectral luminous efficiency curve, and therefore, when a quantum efficiency curve for a monochromatic waveband obtained by filtering ambient light based on a monochromatic channel matches the spectral luminous efficiency curve, a reliable spectral luminous efficiency curve can be obtained with a small computing workload, thereby obtaining a reliable sensor correction coefficient by computing a proportional relationship between a sensor sampling value and an illuminance level of the filtered light, and performing reliable photoelectric detection by a light sensor based on the sensor correction coefficient.

In another implementation of the present disclosure, the computing the proportional relationship between the sensor sampling value and the measured illuminance level of the filtered light includes: determining an adjustment value of the sensor sampling value under target exposure time and a target gain; and determining the proportional relationship based on the adjustment value and the measured illuminance level of the filtered light.

Since the target exposure time and the target gain will affect a relationship between the sensor sampling value and the illuminance level, the relationship between the sensor sampling value and the illuminance level under the target exposure time and the target gain is determined, thereby eliminating the influence caused by different exposure times or different gains, and improving the accuracy of the relationship between the sensor sampling value and the illuminance level.

In another implementation of the present disclosure, the method further includes: the method for detecting an ambient light illuminance in any one of the above embodiments.

Figure 5B:
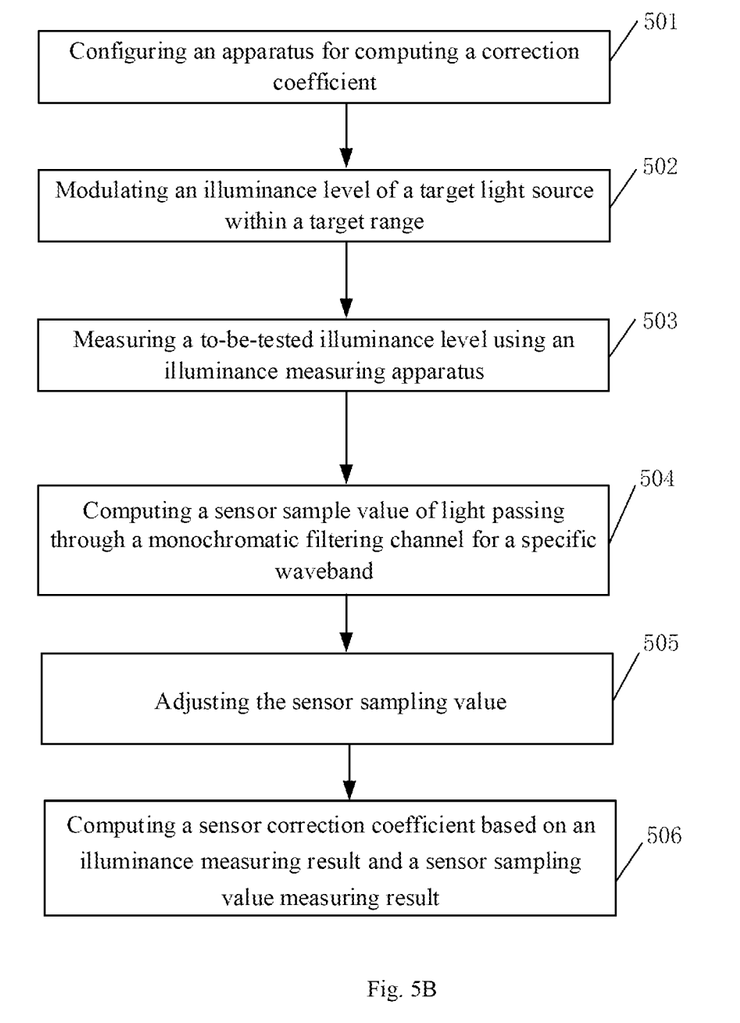
FIG. 5B is a schematic flowchart of a method for computing a correction coefficient according to another embodiment of the present disclosure.

FIG. 5B is a schematic flowchart of a method for computing a correction coefficient according to another embodiment of the present disclosure.

Step 501: configuring an apparatus for computing a correction coefficient. For example, a target light source may be provided, e.g., above or below a display screen in an electronic device. An ambient light sensor may be arranged below the display screen.

Step 502: modulating an illuminance level of a target light source within a target range. For example, the illuminance level of the target light source is adjusted within an adjustment range from 0 to 200 lux (illumination unit, for characterizing the magnitude of illuminance level), to obtain a plurality of beams of light.

Step 503: measuring a to-be-tested illuminance level using an illuminance measuring apparatus such as a spectrometer (illuminometer). For example, a group of illuminance values of light passing through a monochromatic filtering channel for a specific waveband are computed.

Step 504: computing a sensor sample value of light passing through a monochromatic filtering channel for a specific waveband. For example, a group of initial DN values of light with the above group of illuminance values passing through a G monochromatic channel are computed.

Step 505: adjusting the sensor sampling value. For example, a group of DN values for a target gain over target exposure time for a group of initial DN values are computed.

Step 506: computing a sensor correction coefficient based on an illuminance measuring result and a sensor sampling value measuring result. For example, a corresponding relationship is established to obtain a correction curve reflecting a relationship between the correction coefficient and the sensor sampling value.

It should be understood that the above steps may be repeated for a plurality of times of correction, to obtain a plurality of curves for averaging.

Figure 6A:
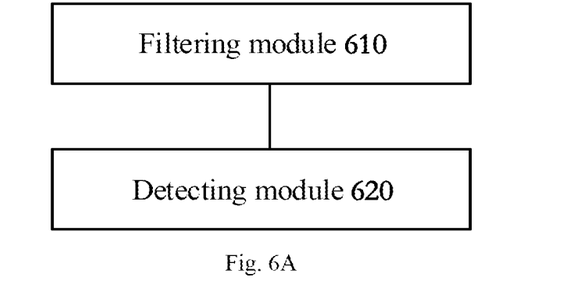
FIG. 6A is a schematic block diagram of an apparatus for detecting an ambient light illuminance according to another embodiment of the present disclosure.

FIG. 6A is a schematic block diagram of an apparatus for detecting an ambient light illuminance according to another embodiment of the present disclosure. The apparatus for detecting an ambient light illuminance in FIG. 6A includes:

a filtering module 610 configured to filter ambient light based on a monochromatic channel, such that a quantum efficiency curve of the filtered light matches a spectral luminous efficiency curve; and a detecting module 620 configured to perform photoelectric detection on the filtered light to obtain an illuminance level of the ambient light.

In solutions of the embodiments of the present disclosure, the photoelectric detection may be equivalent to obtaining an illuminance level of light by convolutional computation based on a spectral luminous efficiency curve, and therefore, when a quantum efficiency curve for a monochromatic waveband obtained by filtering ambient light based on a monochromatic channel matches the spectral luminous efficiency curve, a reliable spectral luminous efficiency curve can be obtained with a small computing workload, thereby avoiding a large computing workload caused when collecting light in a plurality of wavebands whist guaranteeing that a reliable illuminance level of the ambient light can be obtained during photoelectric detection of the filtered light.

In another implementation of the present disclosure, the filtering module is further configured to: filter the ambient light using a filter element having the monochromatic channel.

In another implementation of the present disclosure, the detecting module is further configured to: perform photoelectric detection on the filtered light using a light sensor, where the filter element is arranged on a photosensitive surface of the light sensor.

In another implementation of the present disclosure, the filter element includes a plurality of adjacent filtering channels, where the plurality of adjacent filtering channels corresponds to a plurality of adjacent regions on the photosensitive surface respectively. The filter element includes the plurality of adjacent filtering channels, where the plurality of adjacent filtering channels corresponds to the plurality of adjacent regions on the photosensitive surface respectively, thereby achieving backward compatibility of components. In other words, it is only necessary to adjust a filtering range of each filtering channel to a monochromatic filtering range without excessively changing a hardware structure of a component, and then the filtering of light in the monochromatic waveband is realized.

In another implementation of the present disclosure, the detecting module is further configured to: perform photoelectric detection on the filtered light using the light sensor, where the filtering module is further configured to perform filtering based on a spectral response channel for the light sensor, and the spectral response channel has a spectral response parameter for a filtering waveband of the monochromatic channel.

In another implementation of the present disclosure, the filter element is a substrate that allows light in the monochromatic waveband to pass through, and the substrate is arranged on the surface of the light sensor.

In another implementation of the present disclosure, the detecting module is further configured to: perform photoelectric detection on the filtered light using the light sensor, to obtain a sensor sampling value of the light; and correct the sensor sampling value of the light based on a preset sensor correction coefficient to obtain the illuminance level of the ambient light.

In another implementation of the present disclosure, the ambient light is under-screen ambient light, where the detecting module is further configured to: remove screen light leakage in the light to obtain a correction value of the sensor sampling value; and determine an illuminance level of the under-screen ambient light based on a proportional relationship between the correction value and the sensor correction coefficient.

In another implementation of the present disclosure, the ambient light is under-screen ambient light, where the detecting module is further configured to: determine an initial illuminance level of the ambient light based on a proportional relationship between the sensor sampling value of the light and the sensor correction coefficient; and correct the initial illuminance level of the ambient light by removing screen light leakage in the light, to obtain an illuminance level of the under-screen ambient light.

The apparatus in the present embodiment is configured to implement the corresponding methods in the above method embodiments, and has the beneficial effects of the corresponding method embodiments. The description will not be repeated here. In addition, the description of the corresponding portions in the above method embodiments may be referred to for function implementation of each module in the apparatus of the present embodiment. The description will not be repeated here.

Figure 7A:
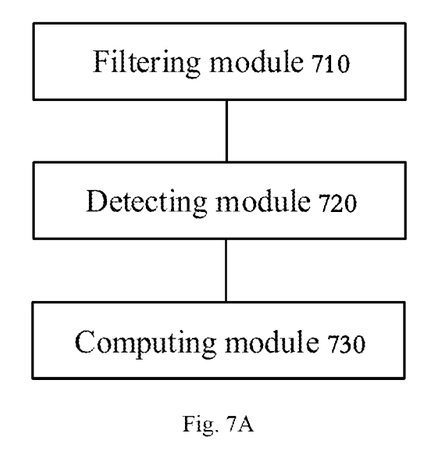
FIG. 7A is a schematic block diagram of an apparatus for computing a correction coefficient according to another embodiment of the present disclosure.

FIG. 7A is a schematic block diagram of an apparatus for computing a correction coefficient according to another embodiment of the present disclosure. The apparatus for computing a correction coefficient in FIG. 7 includes:

a filtering module 710 configured to filter light of a to-be-tested light source based on a monochromatic channel, such that a quantum efficiency curve of the filtered light matches a spectral luminous efficiency curve;

a detecting module 720 configured to detect a sensor sampling value of the filtered light using a light sensor; and a computing module 730 configured to compute a proportional relationship between the sensor sampling value and a measured illuminance level of the filtered light, to obtain a sensor correction coefficient of the light sensor.

In solutions of the embodiments of the present disclosure, the photoelectric detection may be equivalent to obtaining an illuminance level of light by convolutional computation based on a spectral luminous efficiency curve, and therefore, when a quantum efficiency curve for a monochromatic waveband obtained by filtering ambient light based on a monochromatic channel matches the spectral luminous efficiency curve, a reliable spectral luminous efficiency curve can be obtained with a small computing workload, thereby obtaining a reliable sensor correction coefficient by computing a proportional relationship between a sensor sampling value and an illuminance level of the filtered light, and performing reliable photoelectric detection by a light sensor based on the sensor correction coefficient.

In an example, the computing module is further configured to: determine an adjustment value of the sensor sampling value under target exposure time and a target gain; and determine the proportional relationship based on the adjustment value and the measured illuminance level of the light of the to-be-tested light source.

Figure 7B:
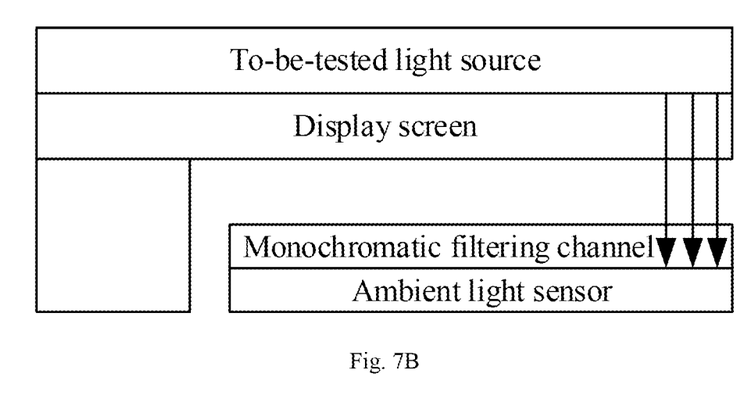
FIG. 7B is a schematic diagram of an apparatus for computing a correction coefficient according to another embodiment of the present disclosure.

FIG. 7B is a schematic diagram of an apparatus for computing a correction coefficient according to another embodiment of the present disclosure. As shown in the figure, the apparatus for computing a correction coefficient may include a to-be-tested light source and an electronic device, i.e., the test may be performed by the electronic device, a sensor correction coefficient may be obtained after the test is completed, and the sensor correction coefficient may be stored (for example, the sensor correction coefficient may be stored in a storage space of a light sensor itself, or may be stored in the electronic device) for ambient light detection. The to-be-tested light source may be arranged above an apparatus for detecting ambient light. The apparatus for detecting ambient light may include a display screen, a filter element arranged below the display screen and having a monochromatic filtering channel, and a light sensor arranged below the display screen, such as an ambient light sensor. The filter element may be arranged between the light sensor and the display screen.

In an example, the whole apparatus for computing a correction coefficient may be arranged under no light conditions for determining the correction coefficient. For example, an ALS may be arranged below a display screen of an electronic device such as a mobile phone (e.g., a mobile phone screen), and may be arranged below the to-be-tested light source (a light source for coefficient correction) after the display screen of the electronic device is turned off. The to-be-tested light source includes, but is not limited to, a D50 light source. The D50 light source may be used as the to-be-tested light source, and a sensor sampling value (e.g., a DN value of the ambient light sensor) of light filtered through the monochromatic filtering channel may be obtained at the light sensor accordingly. An illuminance value Y at a position on the light sensor where the filtered light is sensed may be measured using an apparatus such as an illuminometer. An illuminance level of D50 may be changed (for example, adjusted within an adjustment range from 0 to 200 lux), to obtain several groups of DN values corresponding to different illuminance levels. The collected DN values may be converted into DN values under the same exposure time and the same gain, to obtain a correction curve between the illuminance level Y and the sampling value DN.

The apparatus in the present embodiment is configured to implement the corresponding methods in the above method embodiments, and has the beneficial effects of the corresponding method embodiments. The description will not be repeated here. In addition, the description of the corresponding portions in the above method embodiments may be referred to for function implementation of each module in the apparatus of the present embodiment. The description will not be repeated here.

Figure 8A:
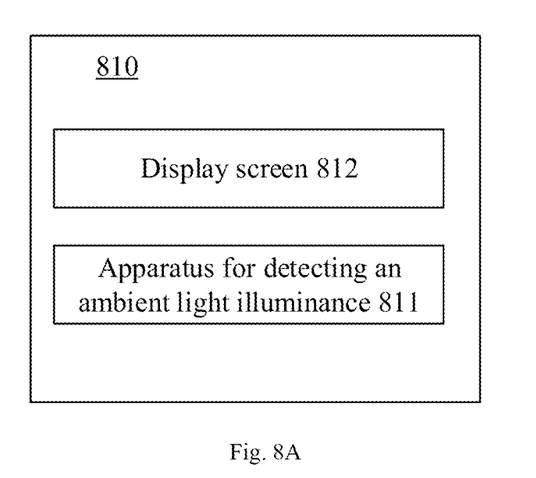
FIG. 8A is a schematic block diagram of an electronic device according to another embodiment of the present disclosure.

FIG. 8A is a schematic block diagram of an electronic device according to another embodiment of the present disclosure. An electronic device 810 in FIG. 8A includes: an apparatus 811 for detecting an ambient light illuminance and a display screen 812, where the apparatus 811 for detecting an ambient light illuminance is arranged below the display screen 812.

Figure 8B:
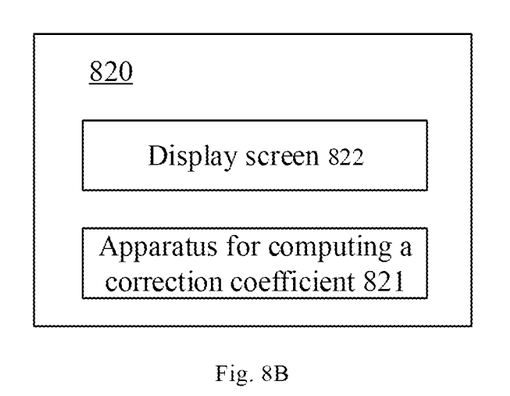
FIG. 8B is a schematic block diagram of an electronic device according to another embodiment of the present disclosure.

FIG. 8B is a schematic block diagram of an electronic device according to another embodiment of the present disclosure. An electronic device 820 in FIG. 8B includes: an apparatus 821 for computing a correction coefficient and a display screen 822, where the apparatus 821 for computing a correction coefficient is arranged below the display screen 822.

The apparatus in the present embodiment is configured to implement the corresponding methods in the above method embodiments, and has the beneficial effects of the corresponding method embodiments. The description will not be repeated here. In addition, the description of the corresponding portions in the above method embodiments may be referred to for function implementation of each module in the apparatus of the present embodiment. The description will not be repeated here.

The electronic device applied to the solutions of the embodiments of the present disclosure includes, but is not limited to:

(1) a mobile communication device: Such a device is characterized by having mobile communication functions, and is mainly intended to provide voice and data communication. Such a terminal includes: a smart phone (e.g., an iPhone), a multimedia phone, a functional phone, a low-end phone, and the like.

(2) an ultra-mobile personal computer device: Such a device belongs to a category of personal computers, has computing and processing functions, and generally also has the characteristics of mobile Internet access. Such a terminal includes: a device, such as a PDA, a MID, and a UMPC, e.g., an iPad.

(3) a portable entertainment device: Such a device can display and play multimedia contents. Such a device includes: an audio player, a video player (e.g., an iPod), a handheld game player, an e-book, a smart toy, and a portable vehicle navigation device.

(4) other electronic devices having data interaction functions.

So far, specific embodiments of this subject matter have been described. Other embodiments fall within the scope of the appended claims. In some cases, actions disclosed in the appended claims may be performed in different orders and can still achieve desired results. In addition, the processes depicted in the figures are not necessarily required to achieve the desired results in the shown particular order or sequential order. In some embodiments, multitasking and parallel processing may be advantageous.

In the 1990s, an improvement of a technology can be clearly distinguished between a hardware improvement (e.g., an improvement on a circuit structure of a diode, a transistor, a switch, or the like) or a software improvement (e.g., an improvement on a process). However, with the development of the technology, at present, improvements of many processes can be regarded as direct improvements of a hardware circuit structure. Almost all designers obtain a corresponding hardware circuit structure by programming the improved process into a hardware circuit. Therefore, it cannot be said that an improvement of a process cannot be implemented with hardware entity modules. For example, a programmable logic device (PLD) (e.g., a Field Programmable Gate Array (FPGA)) is such an integrated circuit that its logical functions are determined by a user through programming a device. A designer "integrates" a digital system onto a PLD by programming by himself without requiring a chip manufacturer to design and manufacture a dedicated integrated circuit chip. Further, at present, instead of manually making integrated circuit chips, this kind of programming is mostly implemented by using "logic compiler" software, which is similar to a software compiler used in program development and compilation. The previous original code must also be compiled in a specific programming language, which is referred to as a Hardware Description Language (HDL), and there is not only one kind, but many kinds of HDL, e.g., ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are most commonly used. Those skilled in the art should further clearly know that it will be very easy to obtain a hardware circuit that implements the logical process only by slightly logically programming the process with the above hardware description languages and programming the process into an integrated circuit.

The controller may be implemented in any suitable manner. For example, the controller may take the form of a microprocessor or a processor and a computer readable medium storing computer readable program code (such as software or firmware) executable by the (micro)processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may also be implemented as a part of the memory control logic. Those skilled in the art also know that in addition to implementing the controller in a manner of purely computer readable program code, it is completely possible to logically programme the process steps such that the controller implements a same function in the form of a logic gate, a switch, an application specific integrated circuit, a programmable logic controller, an embedded microcontroller, or the like. Therefore, such a controller may be regarded as a hardware component, and an apparatus included therein and configured to implement various functions may also be regarded as a structure within the hardware component. Or even, it may be regarded that the apparatus configured to implement various functions may be a software module for implementing the method, or may be a structure within the hardware component.

The system, apparatus, modules, or units illustrated in the above embodiments may be specifically implemented by a computer chip or entity, or by a product having a function. A typical implementing device is a computer. Specifically, the computer, e.g., may be a personal computer, a laptop computer, a cellular phone, a camera phone, a smart phone, a personal digital assistant, a medium player, a navigation device, an e-mail device, a game console, a tablet computer, a wearable device, or a combination of any device of these devices.

For ease of description, the above apparatus is described by dividing the apparatus into various units based on functions, and then describing the units respectively. Of course, when the present disclosure is implemented, the functions of the units can be implemented in a same piece or more pieces of software and/or hardware.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer usable storage mediums (including, but not limited to, a disk memory, a CD-ROM, an optical memory, and the like) having computer usable program code embodied thereon.

The present disclosure is described with reference to the flow charts and/or block diagrams of the method, device (system), and computer program product according to the embodiments of the present disclosure. It should be understood that each process and/or block in the flow charts and/or block diagrams as well as combinations of processes and/or blocks in the flow charts and/or block diagrams may be implemented by computer program instructions. The computer program instructions may be provided to a processor of a general purpose computer, a special purpose computer, an embedded processing machine, or other programmable data processing devices to produce a machine, thereby producing an apparatus for implementing the functions specified in one or more processes in the flow charts and/or one or more blocks in the block diagrams based on the instructions executed via the processor of the computer or other programmable data processing devices.

These computer program instructions may also be stored in a computer readable memory that can direct a computer or other programmable data processing devices to function in a particular manner, such that the instructions stored in the computer readable memory produce an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be executed on the computer or other programmable devices, to produce a computer implemented process, such that the instructions executed on the computer or other programmable devices provide steps for implementing the functions specified in one or more processes in the flow charts and/or one or more blocks in the block diagrams.

In a typical configuration, a computing device includes one or more processors (CPU), an input/output interface, a network interface, and an internal memory.

The internal memory may include forms, such as a volatile memory, a random access memory (RAM), and/or a nonvolatile memory, e.g., a read only memory (ROM) or a flash RAM, in a computer readable medium. The internal memory is an example of the computer readable medium.

The computer readable medium includes permanent and non-permanent mediums, removable and non-removable mediums, and information storage may be implemented by any method or technology. The information may be a computer readable instruction, a data structure, a program module, or other data. Examples of a computer storage medium include, but are not limited to, a phase-change random access memory (PRAM), a static random access memory (SRAM), a dynamic random access memory (DRAM), a random access memory (RAM) of other type, a read only memory (ROM), an electrically erasable programmable read only memory (EEPROM), a flash RAM or other internal memory technology, a compact disc read only memory (CD-ROM), a digital versatile disc (DVD) or other optical storage, a magnetic cassette tape, a magnetic tape or disk storage or other magnetic storage devices, or any other non-transmission medium, which may be configured to store information accessible to a computing device. As defined herein, the computer readable medium excludes transitory media, e.g., a modulated data signal or carrier wave.

It should be further noted that the terms such as "comprising", "including" or any other variation thereof are intended to cover non-exclusive inclusions, such that a process, a method, an article, or a device that includes a series of elements not only includes those elements, but also includes other elements that are not explicitly listed, or further includes elements that are inherent to such a process, method, article, or device. An element defined by the wording "comprises a . . . " does not, without more constraints, preclude the existence of other identical elements in the process, the method, the article, or the device that includes the element.

Those skilled in the art should understand that the embodiments of the present disclosure may be provided as a method, a system, or a computer program product. Accordingly, the present disclosure may take the form of an entirely hardware embodiment, an entirely software embodiment, or an embodiment combining software and hardware. Further, the present disclosure may take the form of a computer program product embodied on one or more computer usable storage mediums (including, but not limited to, a disk memory, a CD-ROM, an optical memory, and the like) having computer usable program code embodied thereon.

The present disclosure may be described in a general context of computer executable instructions executed by a computer, e.g., program modules. Generally, the program modules include routines, programs, objects, components, data structures, etc. that execute specific tasks or implement specific abstract data types. The present disclosure may also be practiced in distributed computing environments. In these distributed computing environments, a task is executed by remote processing devices connected through a communication network. In a distributed computing environment, the program modules may be located in local and remote computer storage mediums including storage devices.

The embodiments in the present specification are described progressively, identical or similar portions between the embodiments may be mutually referred to, and differences of each embodiment from other embodiments are mainly described in the embodiment. In particular, system embodiments are substantially similar to method embodiments, and therefore are relatively simply described. A part of description of the method embodiments may be referred to for relevant details.

The above description merely provides embodiments of the present disclosure, and is not intended to limit the present disclosure. For those skilled in the art, the present disclosure may have various modifications and alterations. Any modification, equivalent replacement, improvement, and the like made within the spirit and principles of the present disclosure should be included within the scope of the appended claims of the present disclosure.

What is claimed is:

1. A method for detecting an ambient light illuminance, comprising:
    based on a monochromatic channel, filtering ambient light, such that a quantum efficiency curve of the filtered light matches a spectral luminous efficiency curve; and
    performing photoelectric detection on the filtered light to obtain an illuminance level of the ambient light.

2. The method according to claim 1, wherein, based on the monochromatic channel, the filtering the ambient light comprises:
    filtering the ambient light using a filter element having the monochromatic channel.

3. The method according to claim 2, wherein the performing photoelectric detection on the filtered light comprises:
    performing photoelectric detection on the filtered light using a light sensor, wherein the filter element is arranged on a photosensitive surface of the light sensor.

4. The method according to claim 3, wherein the filter element comprises a plurality of adjacent filtering channels, wherein the plurality of adjacent filtering channels corresponds to a plurality of adjacent regions on the photosensitive surface respectively.

5. The method according to claim 2, wherein a filtering waveband of the monochromatic channel ranges from 500 nm to 560 nm.

6. The method according to claim 1, wherein the performing photoelectric detection on the filtered light to obtain the illuminance level of the ambient light comprises:
    performing photoelectric detection on the filtered light using a light sensor, to obtain a sensor sampling value of the light; and
    correcting the sensor sampling value of the light based on a preset sensor correction coefficient to obtain the illuminance level of the ambient light.

7. The method according to claim 6, wherein the ambient light is under-screen ambient light, wherein the correcting the sensor sampling value of the light based on the preset sensor correction coefficient to obtain the illuminance level of the ambient light comprises:
    removing screen light leakage in the light to obtain a correction value of the sensor sampling value; and
    determining an illuminance level of the under-screen ambient light based on a proportional relationship between the correction value and the sensor correction coefficient.

8. The method according to claim 6, wherein the ambient light is under-screen ambient light, wherein the correcting the sensor sampling value of the light based on the preset sensor correction coefficient to obtain the illuminance level of the ambient light comprises:
    determining an initial illuminance level of the ambient light based on a proportional relationship between the sensor sampling value of the light and the sensor correction coefficient; and
    correcting the initial illuminance level of the ambient light by removing screen light leakage in the light, to obtain an illuminance level of the under-screen ambient light.

9. The method according to claim 1, wherein a difference between an ordinate value of the quantum efficiency curve of the filtered light and an ordinate value of the spectral luminous efficiency curve is within 10%.

10. An apparatus for detecting an ambient light illuminance, comprising:
    a filtering module configured to filter, based on a monochromatic channel, ambient light, such that a quantum efficiency curve of the filtered light matches a spectral luminous efficiency curve; and
    a detecting module configured to perform photoelectric detection on the filtered light to obtain an illuminance level of the ambient light.

11. The apparatus according to claim 10, wherein the filtering module is further configured to: filter the ambient light using a filter element having the monochromatic channel.

12. The apparatus according to claim 11, wherein the detecting module is further configured to: perform photoelectric detection on the filtered light using a light sensor, wherein the filter element is arranged on a photosensitive surface of the light sensor.

13. The apparatus according to claim 12, wherein the filter element comprises a plurality of adjacent filtering channels, wherein the plurality of adjacent filtering channels corresponds to a plurality of adjacent regions on the photosensitive surface respectively.

14. The apparatus according to claim 11, wherein the filter element is a substrate that allows light in a monochromatic waveband to pass through, and the substrate is arranged on the surface of the light sensor.

15. The apparatus according to claim 12, wherein the detecting module is further configured to: perform photoelectric detection on the filtered light using a light sensor, wherein the filtering module is further configured to perform filtering based on a spectral response channel for the light sensor, and the spectral response channel has a spectral response parameter for a filtering waveband of the monochromatic channel.

16. The apparatus according to claim 10, wherein a difference between an ordinate value of the quantum efficiency curve of the filtered light and an ordinate value of the spectral luminous efficiency curve is within 10%.

17. An electronic device, comprising:
   an apparatus for detecting an ambient light illuminance, and a display screen, wherein the apparatus for detecting an ambient light illuminance is arranged below the display screen, and apparatus for detecting an ambient light illuminance comprises:
   a filtering module configured to filter, based on a monochromatic channel, ambient light, such that a quantum efficiency curve of the filtered light matches a spectral luminous efficiency curve; and
   a detecting module configured to perform photoelectric detection on the filtered light to obtain an illuminance level of the ambient light.

* * * * *